Oct. 29, 1935.　　　　　G. G. LANDIS　　　　　2,019,082

DYNAMO ELECTRIC MACHINE

Filed Nov. 20, 1933

INVENTOR.

George G. Landis

BY

Bays Oberlin & Bay

ATTORNEYS.

Patented Oct. 29, 1935

2,019,082

UNITED STATES PATENT OFFICE 2,019,082

DYNAMO ELECTRIC MACHINE

George G. Landis, Cleveland, Ohio, assignor to The Lincoln Electric Company

Application November 20, 1933, Serial No. 698,857

5 Claims. (Cl. 171—242)

This application is a continuation in part of my co-pending application Ser. No. 640,390, filed October 31, 1932, now Patent No. 1,962,692, dated June 12, 1934.

This invention relates, as indicated, to dynamo electric machines and more particularly, to electric current generators adapted particularly for use in the generation of electric current used in the arc welding process.

It is a principal object of my invention to provide a welding current generator, a construction which may be readily and accurately adjusted for varying arc requirements.

It is a further object of my invention to provide a generator in which the recovery time is greatly reduced so as to cause the voltage and current to more closely follow the requirement of the arc.

It is likewise an object of my invention to provide means in association with the generator and responsive to changes in the amount of welding current whereby during any such changes, the energization of the series field or the voltage of the arcing circuit, or both, may be either increased or decreased.

Other objects of my invention will appear as the description proceeds.

To the accomplishment of the foregoing and related ends, said invention, then consists of the means hereinafter fully described and particularly pointed out in the claims, the annexed drawing and the following description setting forth in detail certain means and modes illustrating, however, several of various ways in which the principle of the invention may be used.

Figure 1:
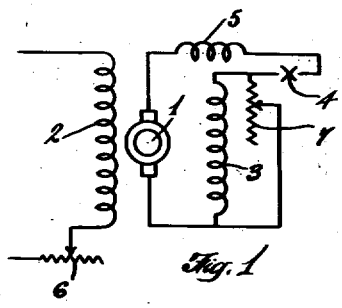
Figure 2:
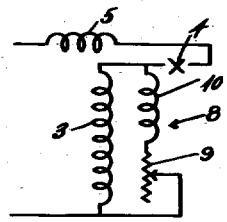

In said annexed drawing:

Fig. 1 is a schematic wiring diagram of a generator constructed in accordance with the principles of this invention showing particularly the series field windings and the means for controlling or varying the strength of the series field; Fig. 2 is similar to a portion of the schematic diagram illustrated in Fig. 1, showing a different arrangement for varying the strength of the series field and Figs. 3 to 12, both inclusive, are similar to Fig. 2, showing alternative forms of the means for varying the strength of the series field.

As previously indicated, the present invention relates particularly to welding current generators and more specifically to the means for varying and controlling the output of the generator so that the same may closely follow the requirements of the welding arc and in a generator constructed in accordance with the principles of this invention. The recovery time after striking the arc is reduced to a minimum.

In my above identified co-pending application there is disclosed an arrangement of the windings and associated mechanism in the generator whereby the transformer action between the series and shunt or separately excited field windings of the generator is practically eliminated. In such application there is also disclosed the use of an inductive shunt for varying the strength of the series field and it is to the use of such inductive shunt for the purpose described that this invention particularly relates.

In Figure 1 of the drawing there is illustrated a welding current generator including a diagrammatically represented armature 1 with associated variable shunt or separately excited field windings 2 and variable series field windings 3. In the armature circuit which includes the arc 4 there may also be included interpole windings 5 as is usually the case in machines of the character under consideration. A variable resistance 6 in series with the shunt or separately excited field winding 2 may be employed for the purpose of regulating and controlling the strength of such field. A shunt including a variable resistance 7 is connected around the series field winding 3 for the purpose of regulating and controlling the strength of the series field. In the ensuing description, it will be assumed that the series field is wound differentially with respect to the shunt and/or separately excited winding and it should also be kept in mind that in an actual construction the series windings 3, as well as the shunt or separately excited windings 2, will probably be split up into sections arranged on the several poles of the machine. However, when such is the case, the several sections of the series winding will be wound cumulatively with respect to each other and differentially with respect to the windings 2.

The construction illustrated in Figure 1 is representative of the arrangements heretofore employed in the prior art welding current generators as taught to the art by Mr. A. H. Homrighaus in his Patent No. 1,238,406, dated August 28, 1917.

When the strength of the series field is varied or controlled by means of a resistance shunt therearound, such arrangement has certain disadvantages which are particularly pronounced and objectionable at the time the arc is struck. In an arrangement such as illustrated in Fig. 1, the impedance of the series winding 3 opposing any sudden change in the amount of current flow therethrough causes the surge of current occurring at the time the arc is struck to substantially all flow through the resistance shunt 7. There is is, therefore, a certain time lag from the instant the arc is struck until the distribution of current flow between the series winding 3 and the shunt 7 reaches equilibrium. This time interval seriously interferes with the recovery rate of the machine and it is to the solution of this problem that the present invention, as exemplified in Figs. 2 to 12 presently to be described, pertains.

In Figs. 2 to 12 showing different modifications of the means for varying the strength of the series field, the armature 1 and its associated shunt or separately excited field winding 2 have not been included for purposes of convenience. It is to be understood, however, that the portions of the circuits illustrated in these figures include the armature circuit of the generator. It should also be pointed out that it is within the contemplation of my invention to variously arrange the series field windings and the interpole winding with respect to the arc and armature, i. e., the leads from the series circuit might well be connected to the opposite poles from those shown in Figure 2 and furthermore, the arc in the series circuit might be positioned in any other desired relation to the remaining windings than that illustrated in the drawing without departing from the principles of this invention.

Referring now more specifically to Fig. 2, the arrangement illustrated herein includes an inductive variable resistance shunt 8 connected around the series winding 3 for the purpose of varying the strength of the series field. The shunt 8 includes a variable resistance unit 9 and a reactance winding 10. When an arrangement such as is illustrated in Fig. 2 is employed, and when the arc is struck closing the armature circuit, the inductive reactance of the winding 10 will immediately effect the proper current distribution between the series field winding 3 and the shunt 8. When a construction such as is illustrated in Fig. 2 is employed, the time of recovery of the machine is materially reduced over the time of recovery of a machine having a winding such as illustrated in Fig. 1.

The proportional relationship between the inductive reactance of the windings 3 and 10, of course, determines the proportional amount of the arc current which will flow through the series winding 3. Obviously, in order to be effective to accomplish the desired ends, the inductive reactance of the winding 10 should be equal to at least a substantial amount of the inductive reactance of the series winding 3. It has been found that the inductive reactance of the shunt 8, in order to at least partially accomplish the desired results, should amount to at least 20% of the inductive reactance of the field winding 3.

The variable resistance 9 in the shunt 8 may, of course, be adjusted similarly to the variable resistance 7 illustrated in Figure 1, whereby there may be adjustments for suitable ranges of automatic regulation of the arcing circuit through a given no-load voltage as taught in the previously identified Patent No. 1,238,406 to Homrighaus.

Figure 3:
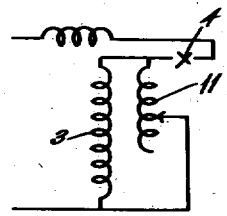

In Figure 3, the variable inductive resistance shunt around the series field winding 3 consists of a winding 11 in which there is combined resistance and inductance and the effectiveness of the shunt is varied by cutting out successive turns of the winding 11 which is effective to simultaneously reduce the reactance and resistance of the shunt.

Figure 4:
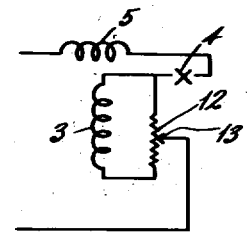
Figure 5:
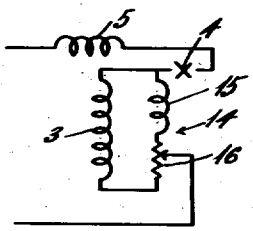
Figure 6:
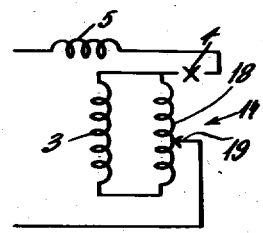

In Figures 4, 5, and 6, there are illustrated three generally similar methods of and means for varying the strength of the series field. The principal difference between the arrangements illustrated in these last-named figures and the arrangements illustrated in Figures 2 and 3 is that all of the resistance and reactance units are in the circuit at all times.

In Figure 4 a variable resistance 12 is connected in parallel with the series field winding 3 and an adjustable contact 13 associated with one side of the line may, when moved along the resistance unit 12, variously proportion the amounts of such resistance which are respectively in series and parallel with the series winding 3.

In Figure 5, the arrangement is somewhat similar to Figures 4 and 2, i. e., the shunt generally indicated at 14 includes a reactance unit 15 and a variable resistance unit 16, these units being connected in series with respect to each other and in parallel with respect to the series winding 3.

In Fig. 6, similarly as in previously described Fig. 3, the shunt generally indicated at 17 consists of combined resistance and reactance winding 18 which is connected in parallel with the series winding 3. The movable lead 19 of the armature circuit of the generator may be moved along the winding 18 to vary the proportional amounts of such winding which are respectively in series and in parallel with the field winding 3.

Figure 7:
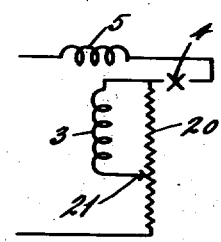
Figure 8:
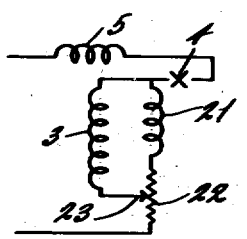

In Fig. 7, the shunt illustrated for the purpose of varying the strength of the series field includes a resistance unit 20 which, depending upon the setting of the movable lead 21, will be wholly or in part either in series or parallel with the series winding 3. In Fig. 8 the shunt, as illustrated in Fig. 7, is modified by the inclusion therein of a reactance winding 21, which has a resistance unit 22 connected in series therewith. In the arrangement illustrated in this figure, movement of the lead 23 to selected points along the resistance unit 22 determines the proportional amounts of such resistance which are respectively in series and parallel with the series winding 3, while the reactance winding 21 is, at all times, connected in parallel with the field winding.

Figure 9:
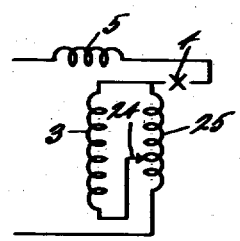

In Fig. 9 there is shown a modification of the disclosure in Fig. 8 along the lines indicated in previously described Figures 3 and 6. The principal difference between the operation of the apparatus illustrated in Fig. 9 and that illustrated in Fig. 8 is that as the resistance in parallel with the series field 3 is reduced by an upward movement of the lead 24, the reactance of the winding 25 in parallel with the series winding 3 is likewise reduced.

Figure 10:
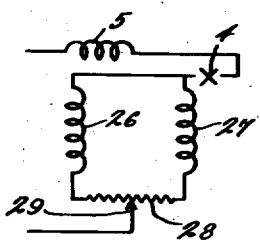

A further arrangement for varying the operating characteristics of the machine is illustrated in Fig. 10, wherein the series field is separated into two parts 26 and 27, respectively, which may have an equal or unequal number of turns and which are differentially compound-wound, i. e., cumulatively with respect to each other and differentially with respect to the shunt or separately excited windings 2, and may be on the same or different pole pieces of the machine. These two fields are arranged in parallel and are connected by means of a bridging variable resistance 28. Movement of the lead 29 of the welding circuit along the resistance 28 will affect the amount of current flowing in the respective windings 26 and 27 and when such windings have a different number of turns, the ampere turns strength of the series field may be varied without a change in the amount of welding current flow.

Figure 11:
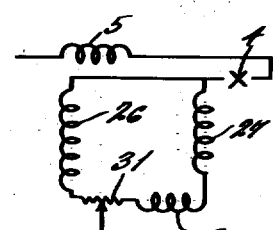
Figure 12:
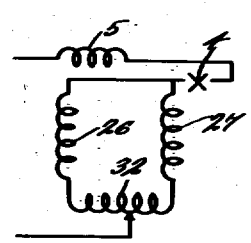

The arrangement illustrated in Fig. 11 is similar to that illustrated in Figure 10, change being made, however, in the inclusion of a reactance winding 30 in series with the bridging resistance 31 and in Figure 12, the bridging resistance and reactance windings are combined into a single unit 32 in the manner explained in connection with the description of previous Figures 3, 6, and 9.

From the foregoing explanation of the invention as illustrated in Figs. 2 to 12, it will be evident that a principal feature of the invention as particularly illustrated in Figs. 2, 3, 5, 6, and 8 to 12 is the employment of an inductance coil in the diverter circuit or shunt for the purpose of limiting the flow of transient currents in this circuit, causing such transients to flow through the series field, thereby speeding up the change in flux in the magnetic circuit of the generator and improving its performance. The desired results are, therefore, obtained in the previously described figures by utilizing the self-inductance of the reactor connected in the diverter circuit.

As previously indicated, a principal change in my apparatus over the prior art is the inclusion of an inductive reactance in parallel with the series field winding in the generator. The relationship between impedance of the branches of the circuit, of course, determines the proportional amounts of the welding current which will respectively flow through the series field winding and the shunt at the instant the arc is struck. If the impedance of the shunt is only equal to a small proportional amount of the impedance of the series field winding, then the major portion of the welding current at the instant the arc is struck will flow through the shunt. If the impedance of the shunt is equal to the impedance of the series field winding, then the weld current flow, at the instant the arc is struck, will be evenly distributed between the two branches. If, however, the impedance of the shunt is considerably greater than the impedance of the series field winding, then at the instant the arc is struck, the major proportion of the welding current will flow through the series field winding.

After the lapse of a sufficient time interval for the distribution of welding current between the series field winding and shunt branches of the circuit to reach equilibrium, the respective amounts of current flow through these branches will depend upon the resistance of such branches and this distribution is, of course, controlled by a setting of the variable resistance in the shunt. From the foregoing, it will be apparent to those familiar with the art that by a proper proportioning of the reactance in the series field and in the shunt therearound, the amount of welding current which will flow through the series field at the instant the arc is struck may be controlled to any extent in order to provide the most desirable operating characteristics for the machine.

In addition to the illustrations of the several modifications illustrated in the drawing and hereinbefore described, it is to be understood, however, that there may be further modifications and particularly other combinations of the illustrated schemes in order to secure different and perhaps more refined control over the strength of the series field and the manner in which the same responds to and follows the current flow in the arc. For instance, as illustrated in my aforementioned co-pending application, the several shunts herein described may be connected around only a portion of the series field winding and again, the number of turns of the series field winding which are in series with the arc and/or in parallel with the shunt may be varied by bringing out taps from the series field windings at selected points.

I wish to particularly point out that it is a feature of this invention to vary the strength of the series field by relatively small increments, which may be accomplished by any of the means and in the several modes above pointed out and described. Such variation by relatively small increments makes it possible to adjust the output of the machine very closely to the exact requirements of the arc.

As previously indicated, it will be apparent to those familiar with the art that there may be various combinations and sub-combinations of the illustrated and described arrangements for varying the strength of the series field and it is within the contemplation of my invention that such variations, combinations and sub-combinations may be made in order to suit the particular requirements, such as the particular operating characteristics of the machine, as well as cost and facility of manufacture.

It is to be understood that the various arrangements illustrated and described herein for varying the strength of the series field in a welding current generator are particularly useful when used in conjunction with a machine in which the windings are arranged as illustrated in the several figures of the drawing of my aforesaid Patent No. 1,962,692, and specific reference is here made to such figures as included within the disclosure of this application.

Other modes of applying the principle if any invention may be employed instead of the one explained, change being made as regards the means herein disclosed, provided those stated by any of the following claims or their equivalent be employed.

I, therefore, particularly point out and distinctly claim as my invention:

1. An electric arc welding system including a welding current generator and an arc circuit, which arc circuit includes a plurality of parallel circuits, one of said parallel circuits containing a series field winding of the generator, another of said parallel circuits containing an inductive resistance winding, and means for simultaneously and oppositely varying the impedance of said parallel circuits.

2. An electric arc welding system including a welding current generator and an arc circuit, which circuit includes a series field winding of the generator and an inductive resistance winding connected in parallel therewith and means for simultaneously varying in opposite directions respectively the impedance of the arcing current circuit through said series field winding and through said inductive resistance winding.

3. An electric arc welding system including a welding current generator and an arc circuit, which circuit includes a series field winding of the generator and an inductive resistance winding connected in parallel therewith and means for simultaneously varying in opposite directions respectively the inductive reactance of the arcing current circuit through said series field winding and through said inductive resistance winding.

4. An electric arc welding system including a welding current generator and an arc circuit, which circuit includes a series field winding of the generator and an inductive resistance winding connected in parallel therewith and means for simultaneously varying in opposite directions respectively the resistance of the arcing current circuit through said series field winding and through said inductive resistance winding without materially varying the inductive reactance of such paths.

5. An electric arc welding system including a welding current generator and an arc circuit, which circuit includes a series field winding of the generator and an inductive resistance winding connected in parallel therewith, and means for simultaneously varying in opposite directions respectively the impedance of the arcing current circuit through said series field winding and the resistance of the arcing current circuit through said inductive resistance winding.

GEORGE G. LANDIS.